Figure 1:
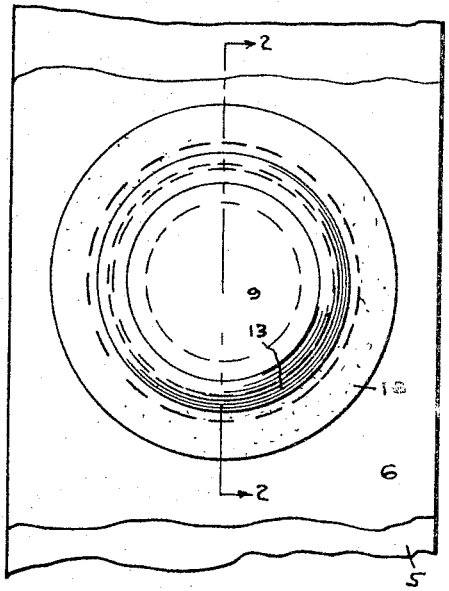

Nov. 17, 1959

R. H. ZANKL 2,913,284

NYLON LOCK BUSHING

Filed April 10, 1957

2 Sheets-Sheet 1

INVENTOR.
ROBERT H. ZANKL,
BY
ATTORNEY.

Nov. 17, 1959 R. H. ZANKL 2,913,284
NYLON LOCK BUSHING
Filed April 10, 1957 2 Sheets-Sheet 2

INVENTOR.
ROBERT H. ZANKL,
BY
ATTORNEY

United States Patent Office 2,913,284
Patented Nov. 17, 1959

2,913,284

NYLON LOCK BUSHING

Robert H. Zankl, Miami, Fla.

Application April 10, 1957, Serial No. 651,962

5 Claims. (Cl. 308—15)

This invention relates to bushings and particularly to bushings employed as bearing members for movable parts.

The invention has for its prime purpose an insertable bushing of non-metallic material, such as nylon and that constitutes the wear resisting bearing liner for relatively movable elements, such for instance, as pivotal connections between linkage or the like employed in window constructions of the type commonly recognized as jalousies or awning type windows where the linkage serves to actuate closure devices, although not restricted in any sense to windows, since the device is applicable as a bearing member in various mechanical devices that are relatively movable.

The invention contemplates a novel form of metallic stud that supports one of the relatively movable members and a novel form of nylon bushing that is insertable within an opening of one of the members to have a snapped locking engagement with the stud that prevents accidental displacement and with the stud and the bushing being constructed in a manner whereby, when the bushing is in locked engagement with the stud, any tendency toward displacement will impart an added locking engagement between the bushing and the stud. Nylon bushings have long been recognized as having a high degree of wear resistance, but the use of nylon bushings heretofore have required that means be provided between the stud and the bushing whereby to prevent the displacement of the bushing, thus very considerably adding to the cost of the assembly of the bushing, such means heretofore employed requiring that the stud be grooved for the reception of lock washers or the like.

Novel features of construction and operation of the device will be more clearly apparent during the course of the following description, reference being had to the accompanying drawings wherein has been illustrated preferred forms of the device and wherein like characters of reference are employed to denote like parts throughout the several figures.

Figure 2:
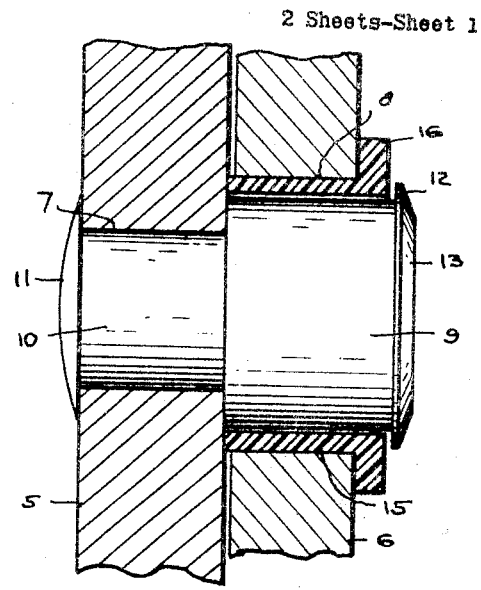
Figure 3:
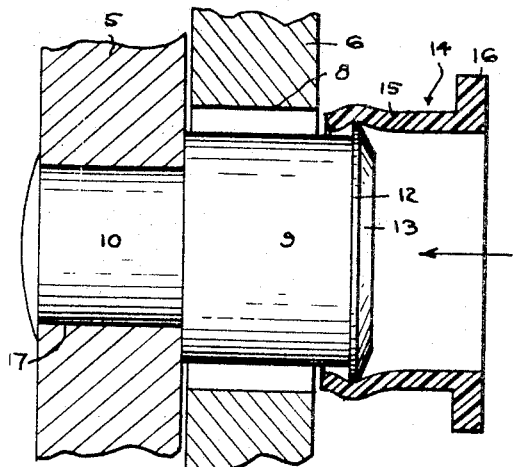
Figure 4:
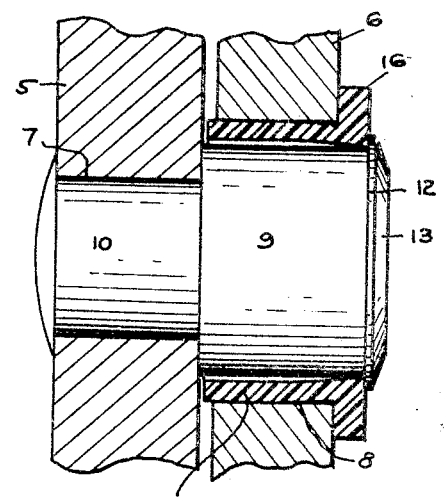
Figure 5:
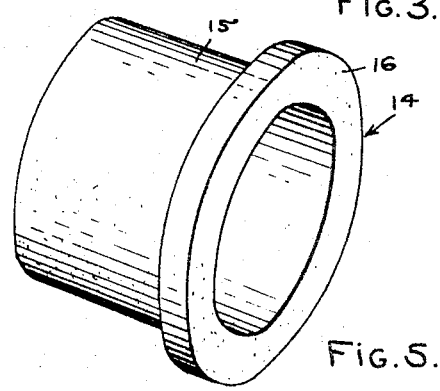
Figure 6:
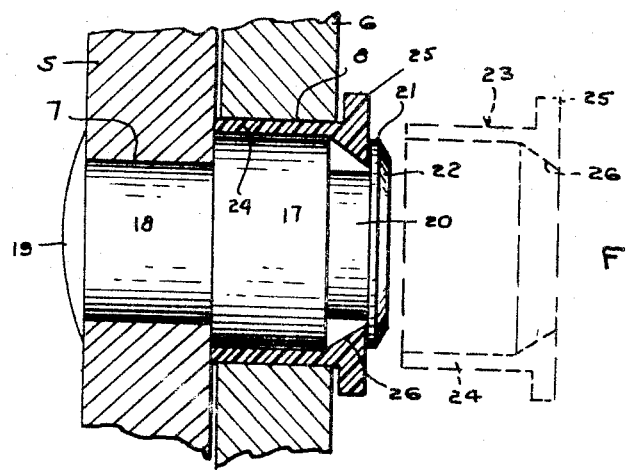
Figure 7:
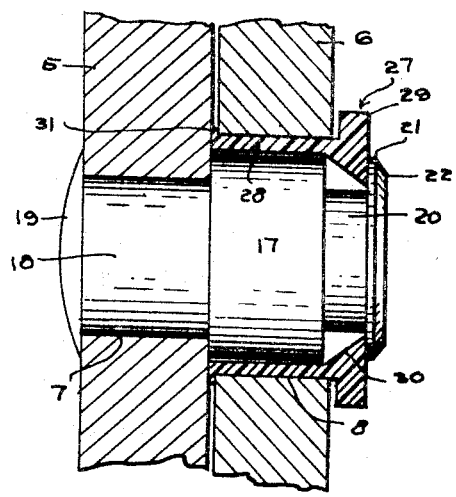
Figure 8:
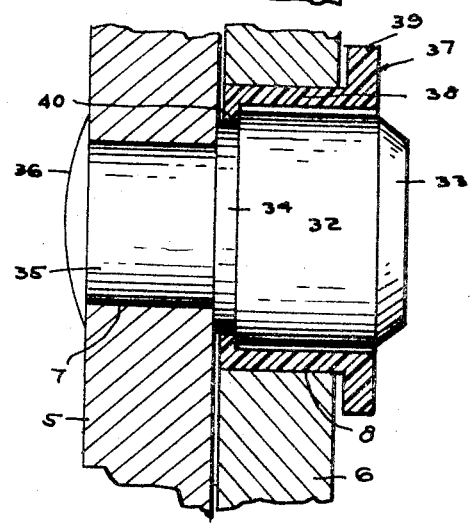

In the drawings:

Figure 1 is a front elevation of a pair of relatively movable members showing the improved stud and the lock bushing in assembled relation, Figure 2 is a vertical section taken substantially on line 2—2 of Figure 1, Figure 3 is a view similar to Figure 2, but illustrating the initial step of assembling the bushing with respect to the stud and a relatively movable member, Figure 4 is a view similar to Figure 2 but illustrating the locking action of the bushing against displacement from the stud, Figure 5 is a perspective view of the bushing, Figure 6 is a view similar to Figure 2 but illustrating a modified form of stud and lock bushing, Figure 7 is a view similar to Figure 2 but illustrating a further modified form of lock bushing and Figure 8 is a view similar to Figure 2 but illustrating a still further modified form of lock bushing.

It is pointed out, that the illustrations in the drawings are greatly enlarged for purpose of clarification and it will be apparent that the bushings and the studs are relatively small as forming pivotal points between relatively movable members. The numeral 5 illustrates one member, such for instance as an operator bar employed in window constructions of the type hereinbefore noted, and 6 designates a relatively movable part, such for instance as linkage employed to shift the bar 5, it being understood that in this particular use of the device, the link 6 partakes of a pivotal movement, while the bar 5 normally partakes of a vertical shifting movement. The bar 5 is cylindrically apertured at 7, while the link is cylindrically apertured at 8. The numeral 9 designates a cylindrical metallic stud having a concentric reduced cylindrical shank 10, that has snug engagement within the aperture 7 and with the stud 9 being rigidly fixed with respect to the bar 5 by spreading or riveting an exposed end of the shank 10, as illustrated at 11. The stud 9 at its forward end is provided with an abrupt shoulder forming flange 12, the forward face of which is tapered at 13. The aperture 8 of the link 6 is relatively larger in diameter than the diameter of the stud 9 forming an opening for the reception of a nylon bushing, illustrated as a whole by the numeral 14.

The bushing 14 is of cylindrical tubular form, embodying a bearing sleeve 15 and a forward circumferential flange 16. The outer diameter of the sleeve 15 is such as to have a slidable engagement within the aperture 8. The inner diameter of the bushing 14 is slightly greater than the diameter of the stud 9, but is of smaller diameter than the shoulder forming flange 12.

In the use of this form of the invention, the stud 9 and the shank 10 having been previously fixed with respect to the bar 5, the link 6 is then engaged over the flange 12 to be concentric therewith. As clearly shown in Figure 3, when the bushing is to be assembled with respect to the stud 9 and the link 6, it is axially engaged with the beveled face 13 and forced axially of the stud, causing the sleeve 15 to stretch and override the flange 12, and a continued inward pressure upon the bushing causes the sleeve to enter the aperture 8, and as the leading end of the bushing overrides the flange 12, it assumes its normal diameter and this pressure is continued until the bushing and its flange 6 have overridden the flange 12, where it snaps behind the shoulder formed by the flange. As the bushing regains its normal diameter, it slides into the aperture 8 to have a relatively snug engagement therein. Any tendency for a displacement of the link 6 from the stud, causes the outer face of the link to engage the flange 16, causing the flange to flex inwardly and causing its inner edge to progressively bite upon the stud 9 to grip against the flange 12, thus providing a very definite lock against the displacement of the bushing, while the flange 16 provides a very definite lock against the displacement of the link 6 from the bushing. It will therefore be apparent, that a very novel form of lock bushing has been provided that is relatively easy to assemble and provides a very desirable form of bushing that is definitely locked against displacement and provides a very desirable wear resisting surface between the movable parts and the stud 9.

In Figure 6, there has been illustrated a modified form of the invention, embodying the relatively movable parts 5 and 6, that are cylindrically apertured at 7 and 8 respectively. A modified form of stud has been employed, embodying a cylindrical bearing surface 17 and a reduced shank 18. The shank 18 engages within the aperture 7 and is riveted at 19 against displacement. The forward portion of the stud 17 is provided with a relatively wide circumferential groove 20, while its terminal end is provided with a shoulder forming flange 21 having a beveled forward face 22. The flange 21 has a diameter substantially equal to the diameter of the stud bearing portion 17, while the diameter of the aperture 8 is relatively greater than the diameter of the bearing 17.

Disposed within the aperture 8 in a manner heretofore described with respect to the first form of the invention, is a nylon bushing, illustrated as a whole by the numeral 23. The bushing 23 embodies a cylindrical sleeve 24, a forward enlarged flange 25 and with the flange terminating inwardly to form an inwardly beveled face 26. The inner diameter of the flange 25 is slightly greater than the diameter of the groove 20, but has a diameter substantially less than the diameter of the flange 21.

In assembling this form of the invention, the bushing is disposed in axial alignment with the stud and then forced inwardly, causing the sleeve to override the flange 21, to a point where the beveled face 26 engages the beveled face 22 of the stud, causing the bushing to expand outwardly as the beveled face 26 overrides the bevel of the flange 21, to a point where the inner circumferential diameter of the flange 25 has snapping engagement behind the shoulder formed by the flange 21, at which time the sleeve 24 is fully engaged within the aperture 8 to a point where it substantially engages the side of the bar 5. Thus, with the bushing in locked engagement with respect to the groove 20, any tendency toward an axial displacement of the link 6 will cause the flange 25 to flex forwardly, causing its inner circumferential edge to bite downwardly behind the flange 21 and against the wall of the groove 20, thus most effectively preventing the displacement of the bushing with respect to the stud, while the flange 25 prevents displacement of the link with respect to the bushing.

In Figure 7 there has been illustrated a still further modified form of the invention, employing the bar 5, the link 6, the bearing forming stud 17, the shank 18, the riveted head 19, the groove 20, the flange 21 and the beveled face 22. The stud of this form of the invention is substantially identical to that previously described with respect to Figure 6. The bushing 27 is substantially identical to that described with respect to Figure 6 and embodies the cylindrical sleeve 28, the forward flange 29 and the inner beveled face 30. The sleeve 28 at its inner end has been provided with a relatively small flange 31, that has snapping engagement behind the link 6, to thus form a spacer between the parts 5 and 6. The operation of this form of the invention is substantially identical to that illustrated in Figure 6, and functions in a similar manner, both as to installation and the locking action between the stud and the bushing.

In Figure 8 there has been illustrated a still further modified form of the invention embodying members 5 and 6 having the apertures 7 and 8 respectively. Fixed with respect to the member 5 is a cylindrical stud embodying a bearing surface 32 having a forward beveled face 33. The stud 32 is circumferentially reduced at 34 and is further reduced in diameter to form a shank 35 that engages the aperture 7. The head portion of the shank 35 is riveted at 36 so that the stud is rigidly fixed with respect to the member 5. The lock bushing of this form of the invention is illustrated as a whole by the numeral 37, and embodies a sleeve 38 having a forward enlarged flange 39 and with the inner end of the sleeve terminating in an inwardly directed flange 40. The diameter of the flange 40 is substantially identical to the reduced portion 34. In assembling this form of the invention, the nylon bushing 37 is disposed in axial alignment with the stud 32, with the flange 40 in engagement with the beveled face 43. Force is then provided against the opposite end of the bushing, causing the flange 40 to cam upwardly over the face 33, to override the stud 32, passing inwardly through the aperture 8 to a point where the flange 40 snaps behind the shoulder formed by the reduced portion 34 thus effectively locking the bushing against displacement with respect to the stud, while the flange 39 prevents displacement of the link 6 with respect to the bushing. It will therefore be apparent that this form of bushing is also very desirable and forms a very effective lock whereby the bushing is positively held against displacement from the stud, while the link 6 is held against displacement from the bushing by the flange 39.

From the foregoing it will be apparent that very novel and inexpensive means have been provided whereby to form an insertable bushing over a stud for forming a bearing surface that has an exceptionally long life, far in excess of metal-to-metal. Nylon bushings have been long recognized for their wearing ability, but bushings heretofore employed perform no other function than as the bearing surface. The bushing of this invention and the novel form of studs employed are interlocked with each other against displacement under all normal conditions. The nylon bushings have a recognized degree of resiliency and this resiliency permits the bushing to be forced over the stud to the point where it is securely locked in position. As before stated, nylon bushings as presently employed require an additional locking means, such as C-washers or other means, while the device of this invention may be quickly and easily engaged and constitutes its own lock with respect to the stud. This combination of the bushing and the stud has resulted in a very considerable saving in materials and assembly costs. With the device employed in the assembly of window linkage or the like, while the savings are relatively small with respect to each individual bushing, the overall saving with respect to a complete window structure is very considerable in a business so highly competitive as the manufacture of both jalousies and awning type windows. The camming ends of the studs greatly facilitate the engagement of the bushings thereover and the assembly can be made in a relatively shorter time than has heretofore been necessary in employing C-washers or the like as the retaining means. The device in actual practice has proven highly satisfactory and the demand is most considerable. While the device has been recited as primarily concerned with pivotal points in window constructions, such as the linkage to operator bars or the like, the structure will be just as applicable as a bushing where any relatively movable parts are supported upon a cylindrical stud. The device as an example could constitute the mounting for rollers or the like and various uses of the device is contemplated.

It is to be understood that the invention is not limited to the precise construction shown but that changes are contemplated as readily fall within the spirit of the invention as shall be determined by the scope of the subjoined claims.

Having described my invention, what I claim as new and desire to secure by Letters Patent is:

1. The combination with an operator bar and a linkage bar for window devices, the linkage bar being relatively pivoted with respect to the operator bar, bearing means for the pivotal support of the linkage bar that comprises a cylindrical stud that is fixed with respect to the operator bar, a bearing bushing, the said bushing including a cylindrical sleeve that is proportioned to engage over the stud and to have telescopic engagement within a cylindrical aperture of the linkage bar, the free end of the stud being beveled and the bushing being expandable whereby the bushing has an expanding guiding engagement to its overlying engagement with respect to the stud, the bushing at one end having a circumferential flange that has a diameter greater than the diameter of the aperture of the linkage bar and means whereby the bushing is locked against axial displacement with respect to the stud.

2. A nylon lock bushing for forming a bearing for the pivotal support of a linkage bar with respect to the operator bar, the combination with a cylindrical metallic stud that is fixed within a cylindrical opening of the operator bar and with the stud projecting outwardly from the side of the operator bar, the stud at its free end having a circumferential flange that is provided with a beveled free end face, the said bushing including a cylindrical sleeve open at its opposite ends, the sleeve being provided at its free end with an outwardly extending circumferential flange, the sleeve having an inner diameter capable of overlying engagement with respect to the stud but of less diameter than the first named flange, the said bushing being expandable whereby to override the first named flange and to be guided in such overriding movement by the beveled face of the stud, the said sleeve having a telescopic engagement within a cylindrical aperture formed in the linkage bar when the sleeve is engaged over the stud, the forward end of the sleeve having a snapping engagement behind the first named flange when fully engaged with the stud, the second named flange overlying the face of the linkage bar, the sleeve and its flange being flexible downwardly to impart a biting engagement with the stud behind the first named flange when a force is exerted upon the linkage bar toward an axial displacement from the stud.

3. A nylon bushing for the bearing support of an operator linkage bar that is pivotally supported upon an operator bar of a window device, the combination with a metallic cylindrical stud that is fixedly connected to the operator bar, the stud having a cylindrical bearing surface and a reduced shank portion for fixed engagement within an aperture formed in the operator bar, the stud at its free end being circumferentially grooved and whereby to form a circumferential flange, the face of the free end of the stud being beveled forwardly from the flange, the said bushing comprising a cylindrical sleeve having an inner diameter capable of overriding engagement with the beveled face and overriding engagement with respect to the flange, the said sleeve having a maximum diameter corresponding to the diameter of an aperture formed in the linkage bar and whereby to have telescopic engagement therein, the sleeve at its free end being provided with an enlarged circumferential flange having a diameter greater than the diameter of the aperture of the linkage bar, the last named flange provided with a circumferential beveled edge having a diameter less than the diameter of the stud, the said bushing being engageable over the stud in a manner whereby the tapered edge forcibly overrides the beveled face of the stud for snapping engagement into the circumferential groove and behind the flange of the stud and whereby to be fully engaged in the aperture of the linkage bar and in full overriding engagement with respect to the bearing surface of the stud.

4. The structure according to claim 3 wherein the opposite end of the sleeve is provided with a radially extending circumferential flange that has snapping engagement behind the linkage bar when the bushing is in fully seated engagement with respect to the stud and the linkage bar and whereby to space the operator bar and the linkage bar apart.

5. A bearing forming nylon bushing in combination with a cylindrical metallic stud that is fixed at one end to an operator bar of a window device, the said stud having a cylindrical bearing surface and a tapered free end, the stud intermediate its length being reduced in diameter to form a shoulder, the said bushing comprising a cylindrical sleeve having a radially extending circumferential flange at one end and a radial and inwardly directed circumferential flange at its opposite end, the sleeve having an outer diameter corresponding to a cylindrical aperture formed in the operator bar, the said second named flange adapted to have a guiding expanding engagement over the tapered end of the stud and an overriding engagement with respect to the bearing surface for snapping engagement behind the shoulder, the said sleeve traversing the aperture of the linkage bar and disposing the first-named flange in overlying relation to the outer face of the linkage bar, the said bushing being locked against axial displacement from the stud and the said linkage bar being held against axial displacement with respect to the bushing by the first named flange.

References Cited in the file of this patent

UNITED STATES PATENTS

| | | |
|---|---|---|
| 2,159,203 | Chayne | May 23, 1939 |
| 2,497,224 | Laure | Feb. 14, 1950 |
| 2,675,283 | Thomson | Apr. 13, 1954 |
| 2,816,453 | Frank | Dec. 17, 1957 |